(12) United States Patent
Chang (10) Patent No.: US 11,670,469 B1
(45) Date of Patent: Jun. 6, 2023

(54) KEY STRUCTURE PROVIDING ADJUSTABILITY OF PRESSING FORCE AND REBOUND FORCE, AND KEY DEVICE USING KEY STRUCTURE

(71) Applicants: HONGFUJIN PRECISION ELECTRONS (YANTAI) CO., LTD., Yantai (CN); HON HAI PRECISION INDUSTRY CO., LTD., New Taipei (TW)

(72) Inventor: Chih-Wei Chang, New Taipei (TW)

(73) Assignees: HONGFUJIN PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/709,663

(22) Filed: Mar. 31, 2022

(30) Foreign Application Priority Data

Feb. 15, 2022 (CN) .......................... 202210135892.0

(51) Int. Cl.
*H01H 36/00* (2006.01)
*H01H 13/84* (2006.01)
*H01H 13/705* (2006.01)
*H01H 13/81* (2006.01)

(52) U.S. Cl.
CPC .......... *H01H 13/84* (2013.01); *H01H 13/705* (2013.01); *H01H 13/81* (2013.01)

(58) Field of Classification Search
CPC ............ H01H 36/00; H01H 2003/506; H01H 2036/0093; H01H 36/002; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79;
(Continued)

(56) References Cited

U.S. PATENT DOCUMENTS 9,947,491 B1 * 4/2018 Thome .................... H01H 3/60
2008/0264770 A1 10/2008 Purcocks
(Continued)

FOREIGN PATENT DOCUMENTS

CN 107305819 A 10/2017
WO 2007114631 A2 10/2007

*Primary Examiner* — Ahmed M Saeed
(74) *Attorney, Agent, or Firm* — ScienBiziP, P.C.

(57) ABSTRACT

A key structure which is adjustable in pressing force required and in duration of key pushback includes a circuit board, a keycap, a first magnetic member, an elastic member, a membrane switch, and a second magnetic member. The keycap includes an extending portion. The membrane switch is spaced apart from the first magnetic member, and the elastic member buffers the first magnetic member against the membrane switch. The second magnetic member is disposed between the membrane switch and the circuit board. When energized, the second magnetic member generates magnetic attraction or magnetic repulsion to the first magnetic member. A pressing force required on the key structure and a rebound force and a delay of rebound can be dynamically adjusted by a direction and magnitude of a current applied to the second magnetic member. A key device including the key structure is also disclosed.

19 Claims, 11 Drawing Sheets

(58) Field of Classification Search
CPC .... H01H 13/52; H01H 13/703; H01H 13/507; H01H 3/12; H01H 13/02
See application file for complete search history.

(56) References Cited

U.S. PATENT DOCUMENTS

| | | | |
|---|---|---|---|
| 2014/0034468 A1* | 2/2014 | Krumpelman | H01H 13/705 200/600 |
| 2016/0042897 A1* | 2/2016 | Qian | H01H 13/85 335/207 |
| 2018/0219552 A1* | 8/2018 | Casparian | H01F 7/204 |

* cited by examiner

KEY STRUCTURE PROVIDING ADJUSTABILITY OF PRESSING FORCE AND REBOUND FORCE, AND KEY DEVICE USING KEY STRUCTURE

FIELD

The subject matter herein generally relates to a key structure and a key device including the key structure.

BACKGROUND

A key structure of a keyboard or a gamepad may generally include a rubber dome and a membrane switch or include a mechanical switch. A principle of the key structure is that a user presses a keycap, and a plunger structure of the keycap downwardly compresses the rubber dome or the mechanical switch, the rubber dome or the mechanical switch is deformed for tactility and then the membrane switch below is touched to generate an electrical signal to convey the user's instructions.

In a common design of the key structure, a pressing force applied on the key structure and a release or rebound force of the key structure are both determined by the rubber dome or a spring, and the pressing force and the release or rebound force in each pressing of the key structure are substantially the same. However, gaming or similar scenes should have the pressing force or the rebound force or duration of the deformation adjustable in real time, to enhance a gaming experience. Therefore, there is room for improvement within the art.

BRIEF DESCRIPTION OF THE DRAWINGS

Implementations of the present technology will now be described, by way of embodiment, with reference to the attached figures.

DETAILED DESCRIPTION

The technical solutions in the embodiments of the present disclosure are clearly and completely described in the following with reference to the accompanying drawings in the embodiments of the present disclosure. The described embodiments are only some of the embodiments of the present disclosure, and not all of the embodiments. All other embodiments obtained by those skilled in the art based on the embodiments of the present disclosure without creative efforts are within the scope of the present disclosure.

Unless otherwise defined, all technical and scientific terms used herein have the same meaning as those understood in the art. The terminology used in the description of the present disclosure is for the purpose of describing particular embodiments and is not intended to limit the disclosure.

Figure 1:
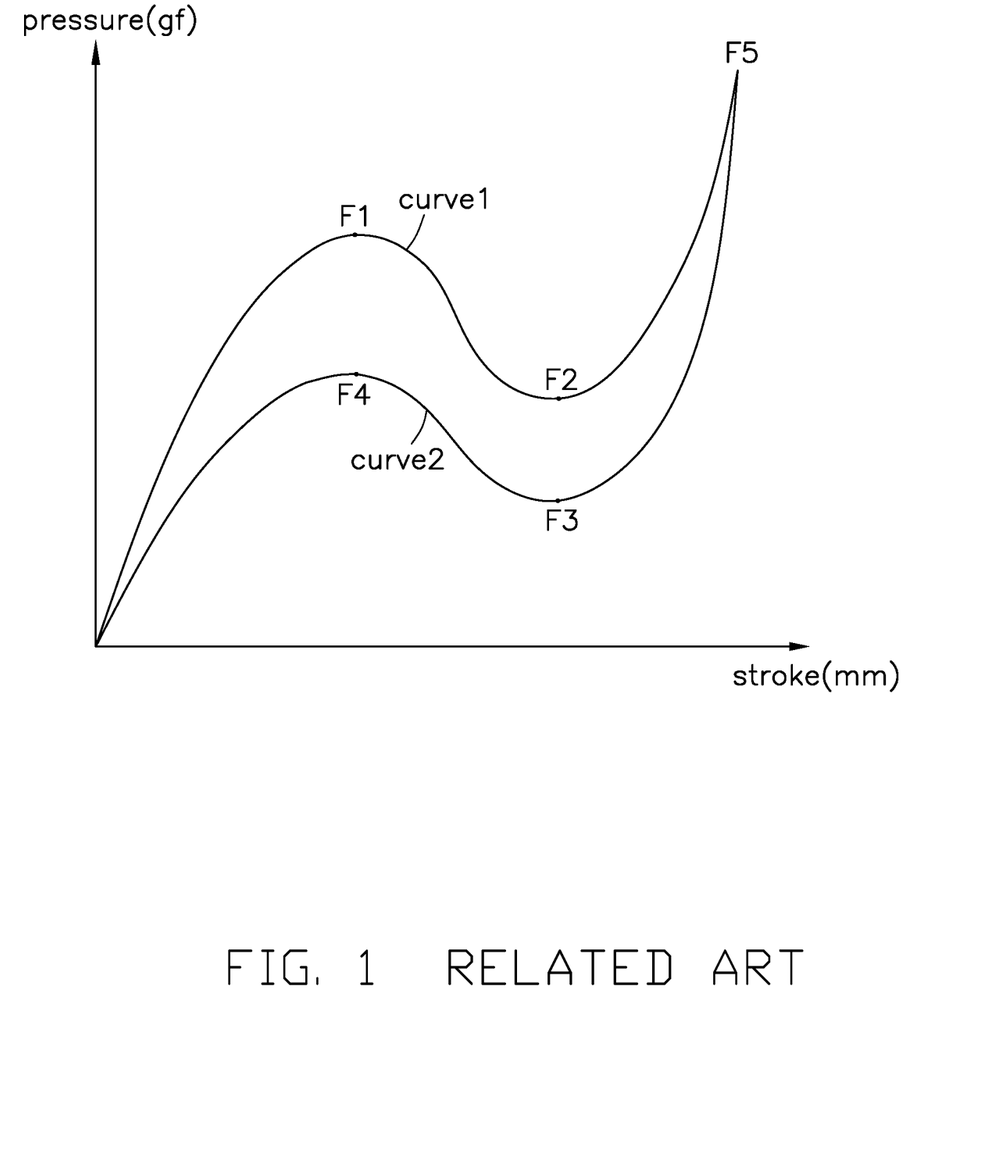
FIG. 1 is a diagram showing curves of elasticity of a membrane keyboard in related art.

FIG. 1 is a diagram illustrating bounce curves of a thin film keyboard of related art. The horizontal axis represents the distance of a keycap stroke (in millimeters). The vertical axis represents the pressure (in grams) experienced by user finger when the keycap is being pushed downwards or rebounding. Curve 1 represents the pressing process when the keycap is being pushed downwards, and curve 2 represents the relieving process when the keycap is rebounding. Origin of coordinates is the start point, point F1 is the peak point, point F2 is the contact point, point F3 is the rebound point, point F4 is the maximum rebound point, and point F5 is the finish point.

Before pressing the keycap, the experienced finger pressure is of the value represented by the origin of coordinates on the bottom-left of the bounce curve. When the keycap is being pushed downwards, the finger encounters more pressure and the distance of the stroke increases as curve 1 moves towards the top-right of the bounce curve. When an elastic deformable portion of an elastic member is no longer able to hold the pressure, it is close to undergoing deformation, and the experienced finger pressure is of the value represented by the peak point F1. When the elastic deformable portion of the elastic member gives way under the pressure, after the peak point F1, the experienced finger pressure is decreasing as curve 1 moves towards the bottom-right of the bounce curve. At the contact point F2, the keycap comes in contact with a circuit board or a thin film conducting layer, thereby making a circuit. Since the keycap has reached the bottom of the structure after the contact point F2, there is a large amount of resistance from the deformed rubber material against any further stroke distance. Therefore, the experienced finger pressure at the finish point F5 may be very large.

Since curve 2 represents the restoring process when the keycap is rebounding, it starts from the right side of the bounce curve. When the keycap is released, all pressure accumulated during the deformation of a rubber dome is instantly released (the rebounding force experienced by the finger) and curve 2 moves from the finish point F5 to the rebound point F3. When the deformed elastic member resumes the shape when just coming in contact with the circuit board or the thin film conducting layer, it starts to rebound until regaining its original shape, during which the rebounding pressure increases. After the elastic member regains its original shape at the maximum rebound point F4, the rebounding pressure decreases until reaching the start point (origin of coordinates).

Being limited to the characteristics of a material of the elastic member, the key structure of the related art is unable to adjust a pressing force applied on the key and a rebound force (or time of) of the key in real time. The present disclosure provides a key structure that can dynamically adjust the pressing force and the rebound time and a key device including the key structure.

First Embodiment

Figure 2:
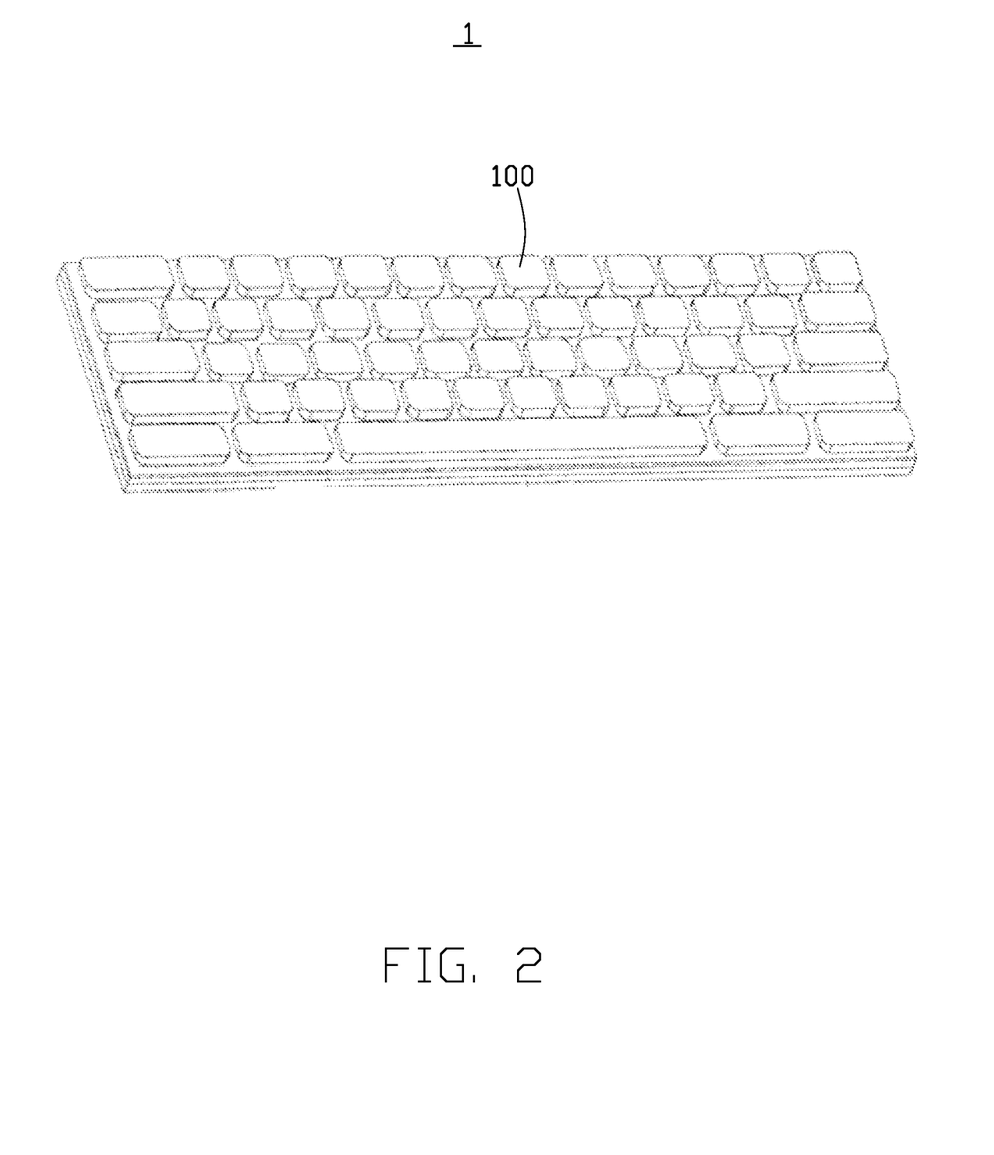
FIG. 2 is a perspective view of a key device according to an embodiment of the present disclosure.

Referring to FIG. 2, an embodiment of a key device 1 is provided. The key device 1 includes a plurality of key structures 100. The key device 1 may be applied to, but is not limited to, notebook computers, tablet computers, TV remote controls, desktop computers, or other electronic devices. In one embodiment, the key device 1 is a membrane keyboard.

Figure 3:
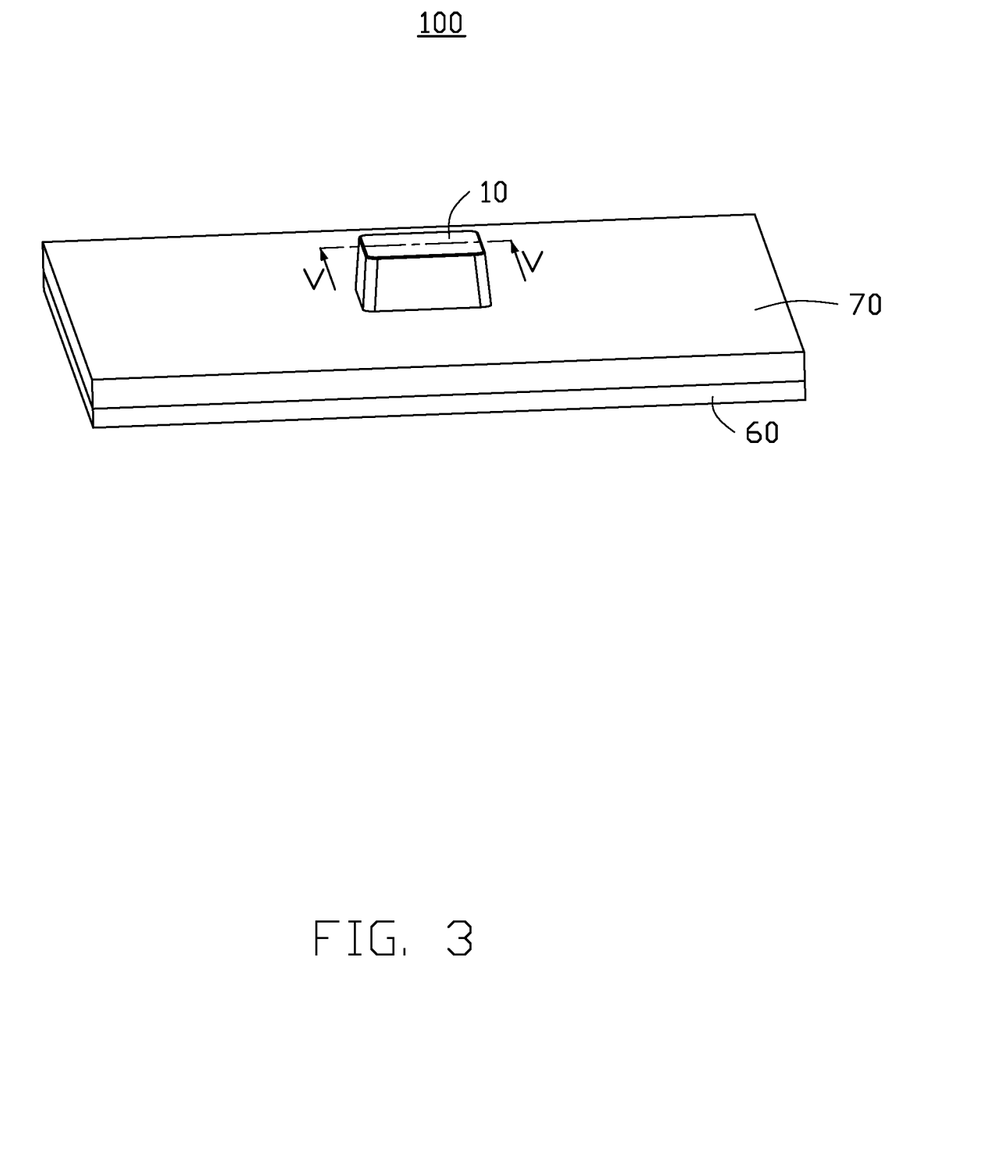
FIG. 3 is a perspective view of a key structure according to an embodiment of the present disclosure.
Figure 4:
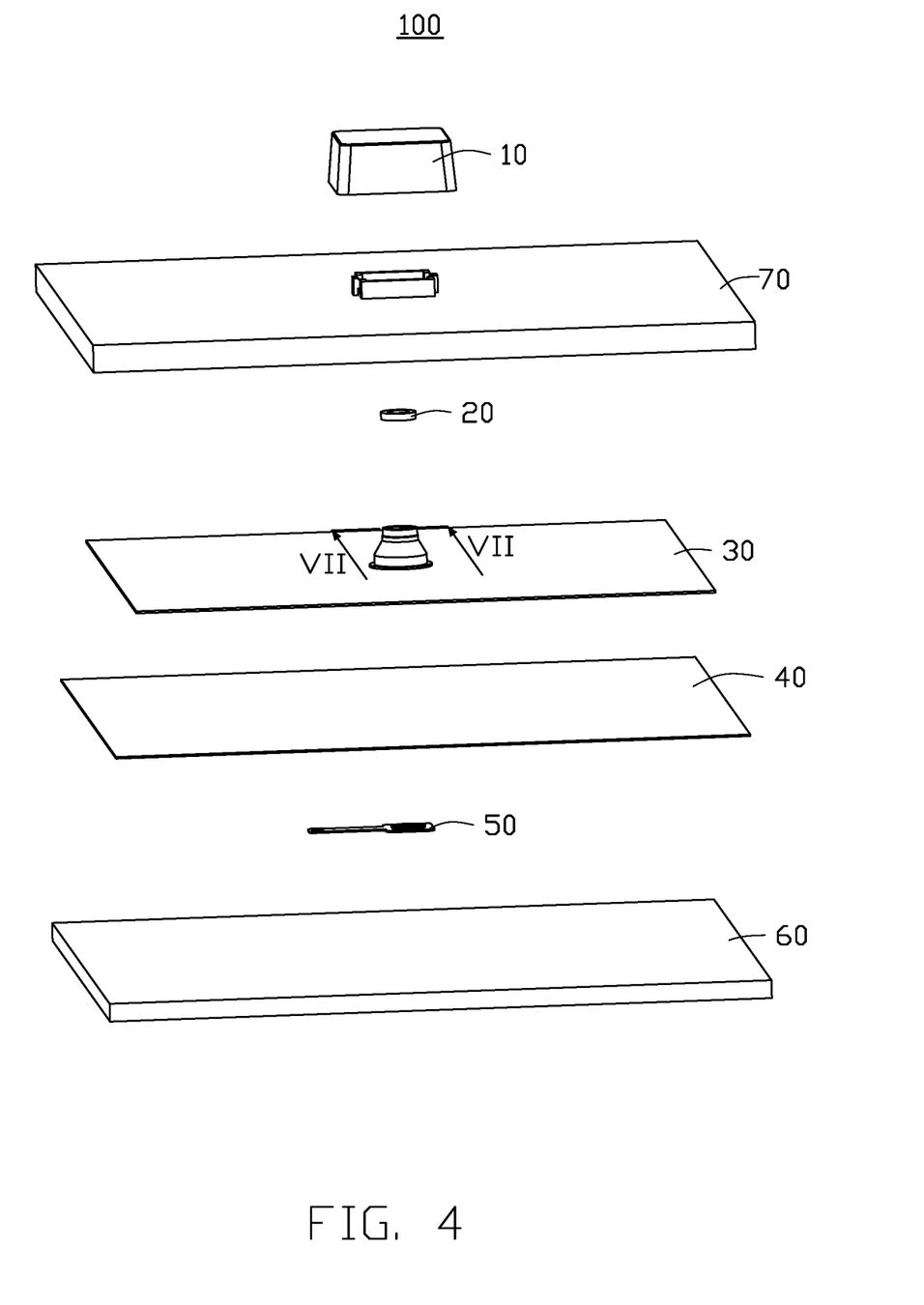
FIG. 4 is an exploded view of the key structure of FIG. 3.
Figure 5:
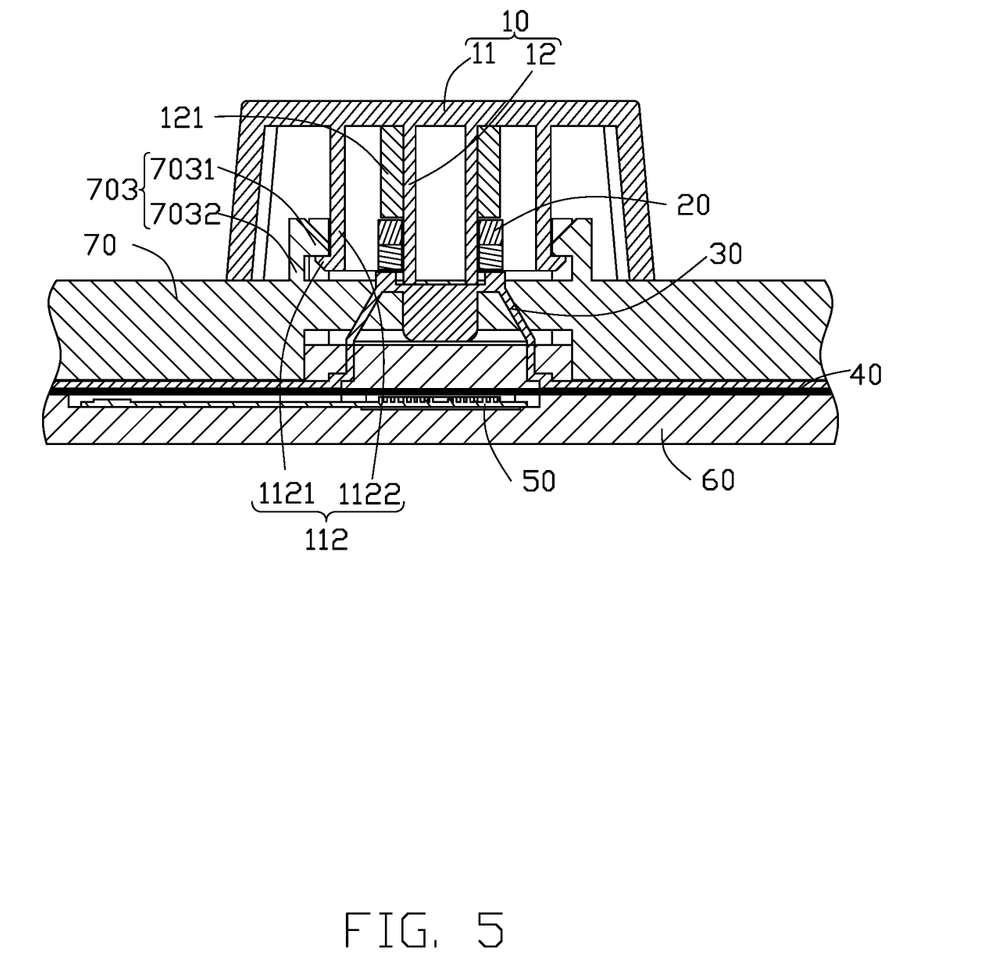
FIG. 5 is a cross-sectional view of the key structure taken along line V-V of FIG. 3.

Referring to FIGS. 3 and 4, in one embodiment, the key structure 100 includes a keycap 10, a first magnetic member 20, an elastic member 30, a membrane switch 40, a second magnetic member 50, and a circuit board 60. Referring to FIG. 5, the keycap 10 includes a pressing portion 11 and an extending portion 12 connected with the pressing portion 11, and the first magnetic member 20 is fixed to the extending portion 12. The membrane switch 40 is spaced apart from the first magnetic member 20. The elastic member 30 can be compressed between the first magnetic member 20 and the membrane switch 40. The second magnetic member 50 is disposed between the membrane switch 40 and the circuit board 60. When the second magnetic member 50 is energized, the second magnetic member 50 generates magnetic attraction or magnetic repulsion to the first magnetic member 20.

The first magnetic member 20 may be an annular permanent magnet, and the second magnetic member 50 may be an induction coil. In one embodiment, the induction coil is arranged coaxially with the annular permanent magnet to maximize the attractive or repulsive force between the induction coil and the annular permanent magnet when the induction coil is energized.

When the keycap 10 is pressed, the first magnetic member 20 moves with the keycap 10 towards the second magnetic member 50, according to Lenz's law, the second magnetic member 50 (induction coil) generates an induced current due to the change of a magnetic field. If a current in the same direction as the induced current is further applied, the second magnetic member 50 will generate a magnetic pole same as the first magnetic member 20, generating magnetic repulsion to the first magnetic member 20, thus the pressing force may be increased. If a current opposite to the induced current is further applied, the second magnetic member 50 will generate a magnetic pole opposite to the first magnetic member 20, generating magnetic attraction to the first magnetic member 20, thus the pressing force may be decreased. In a release (rebound) process of the keycap 10, the induction coil generates an induced current to generate a magnetic field attracted to the first magnetic member 20 according to Lenz's law. Therefore, the following actions can be carried out for the induction coil to dynamically produce different effects on the keycap 10. When a current in the same direction as the induced current is applied to the induction coil, the keycap 10 is attracted, and the time for the keycap 10 to return to its original position can be delayed, extending the rebound time. When a current opposite to the induced current is applied to the induction coil, a repulsive magnetic field is formed to speed up the return of the keycap 10, shortening the rebound time. Thus, the bounce curve can be dynamically adjusted by adjusting a current direction and a magnitude of current of the induction coil according to the needs of content or situation of a game, thereby adjusting the pressing force required and the rebound time of the key structure 100.

For example, after setting parameters or selecting a mode of a game, the first magnetic member (magnet) 20 on the keycap 10 is moved down when the keycap 10 is pressed. The downward motion of the first magnetic member 20 (magnet) cuts electromagnetic induction lines of the electromagnetic field generated by the second magnetic member 50 (induction coil) to generate the induced current. According to the pre-selected mode, the current in the same direction as the induced current or the current in the opposite direction of the induced current may be supplied to the second magnetic member 50 to generate the repulsive or attractive magnetic force between the first magnetic member 20 and the second magnetic member 50. When a main character in a game is, according to the game, injured or poisoned or has no physical strength, or when roads in the game are muddy, the pressing force exerted on the keycap 10 may be increased in real time according to the game scene, to simulate the situation of the main character. On the contrary, when the physical strength of the main character is increased, the pressing force exerted on the keycap 10 may be decreased. Each player may like a different pressing force. Some prefer slightly larger pressing force, while others prefer lighter pressing force. Users can adjust the pressing force according to their preferences. In the rebound process of the keycap 10, the parameters in the game can be set or a mode in the game can be selected, to make the second magnetic member 50 (induction coil) generate magnetic repulsion of the first magnetic member 20. Thus, the upward movement of a released keycap 10 is accelerated, the time to return to the original point is decreased, and the user can make the next action faster. In the rebound process, the second magnetic member 50 (induction coil) can also generate magnetic attraction to the first magnetic member 20, delaying the release and prolonging the rebound time.

Figure 6:
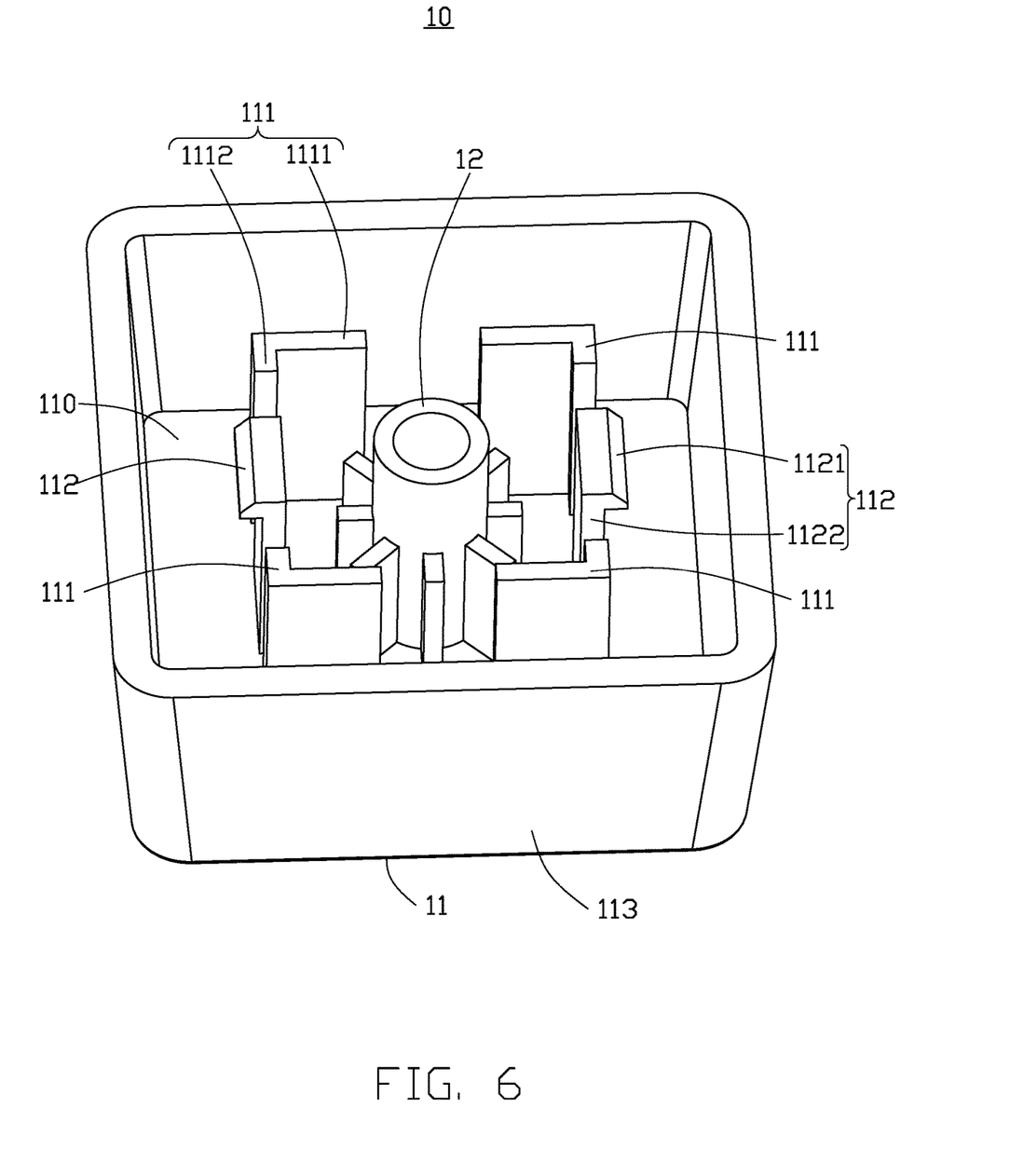
FIG. 6 is a perspective view of a keycap of the key structure of FIG. 3.

Referring to FIG. 6, in some embodiments, the keycap 10 is substantially a rectangular frame and includes a rectangular top wall 110 on which the pressing portion 11 is located, and four side walls 113 extending in the same direction from four edges of the rectangular top wall 110. The keycap 10 also includes the extending portion 12 fixedly connected with the pressing portion 11. The extending portion 12 is disposed on an inner surface of the pressing portion 11 close to the elastic member 30. The extending portion 12 is substantially cylindrical. A plurality of reinforcing blocks 121 may be symmetrically disposed on an outer peripheral surface of the extending portion 12. Without limitation, the reinforcing blocks 121 may be rectangular. The reinforcing blocks 121 and the extending portion 12 may be integrally formed. It is to be understood that the extending portion 12 and the reinforcing blocks 121 may also have other regular or irregular shapes.

Referring to FIGS. 5 and 6, the first magnetic member 20 is fixedly disposed at ends of the reinforcing blocks 121 close to the elastic member 30, and the reinforcing blocks 121 prevent the first magnetic member 20 from moving towards the pressing portion 11. The first magnetic member 20 may be annular and may be fixed on the outer peripheral surface of a bottom end of the extending portion 12 (i.e. the end which is close to the elastic member 30) by adhesive bonding.

As shown in FIG. 6, in some embodiments, a plurality of first limiting portions 111 and a plurality of first locking members 112 are disposed on a surface of the rectangular top wall 110 facing the elastic member 30. The first limiting portions 111 and the first locking members 112 surround the extending portion 12. In FIG. 6, four first limiting portions 111 are disposed around four corners of a rectangle and are substantially L shaped. Each of the first limiting portions 111 includes a first plate 1111 and a second plate 1112 perpendicular to each other. In FIG. 6, there are two first locking members 112, and the two first locking members 112 are disposed on two parallel sides of a rectangle formed by the four first limiting portions 111 and are opposite to each other. The rectangle formed by the four first limiting portions 111 and the two first locking members 112 surrounds the extending portion 12 in the center. Each of the first locking members 112 includes a first locking portion 1121 and a first base body 1122. The first locking portion 1121 extends approximately vertically from an end of the first base body 1122 along a direction away from the extending portion 12.

Figure 7:
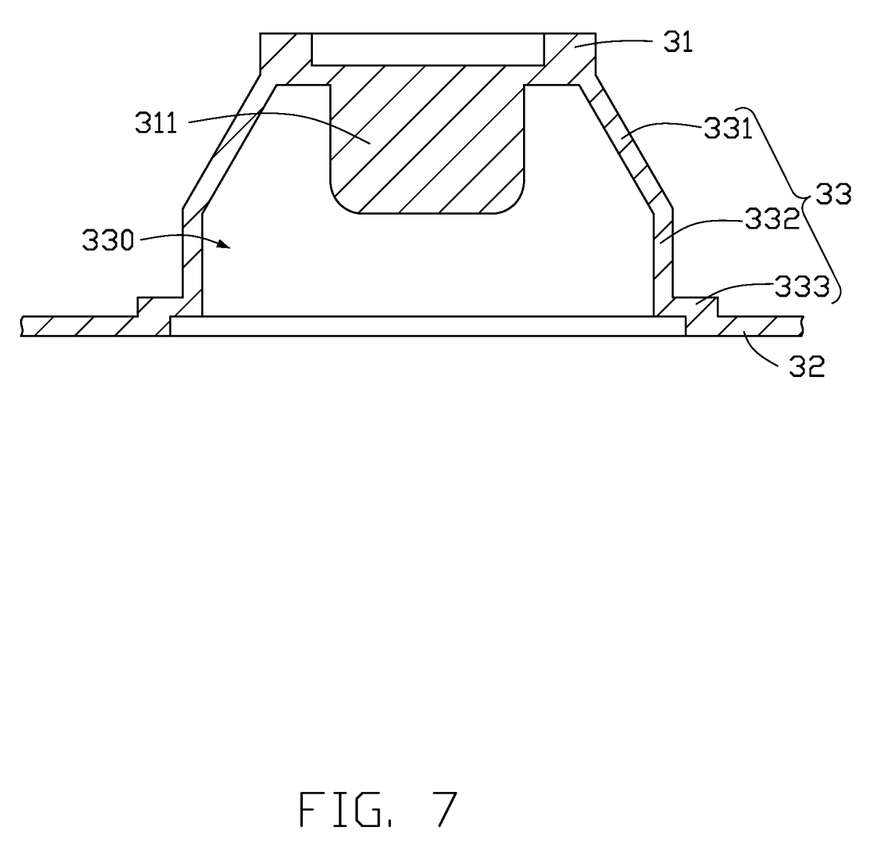
FIG. 7 is a cross-sectional view of an elastic member taken along line VII-VII of FIG. 4.
Figure 8:
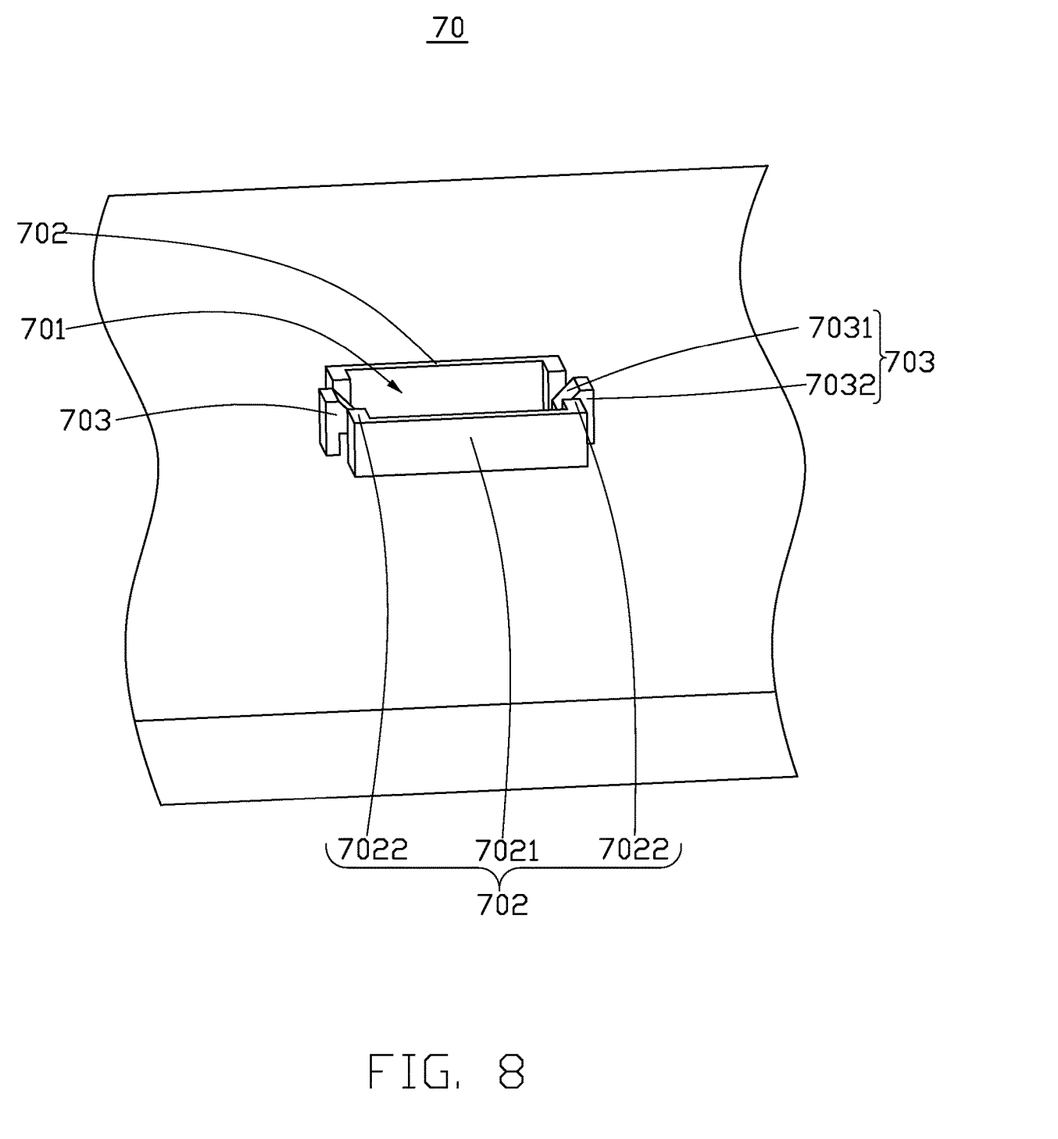
FIG. 8 is a perspective view of a cover of the key structure of FIG. 3.

Referring to FIGS. 5 and 7, in some embodiments, the elastic member 30 includes a first resisting portion 31, a second resisting portion 32, and an elastic deformable portion 33 connecting the first resisting portion 31 and the second resisting portion 32. The first resisting portion 31 abuts against the extending portion 12 of the keycap 10, and the second resisting portion 32 abuts against the membrane switch 40. The elastic deformable portion 33 is provided with a cavity 330 therein. The first resisting portion 31 is substantially circular, the second resisting portion 32 is also substantially circular, and an inner diameter of the second resisting portion 32 is greater than an outer diameter of the first resisting portion 31. In some embodiments, the elastic deformable portion 33 may include a first elastic portion 331, a second elastic portion 332, and a third elastic portion 333 which are successively connected. The first elastic portion 331 is connected with the first resisting portion 31, and the third elastic portion 333 is connected with the second resisting portion 32. The first elastic portion 331 is substantially tapered, and its inner diameter increases in a direction from the first resisting portion 31 to the second resisting portion 32. The second elastic portion 332 and the third elastic portion 333 are both substantially annular, an inner diameter of the second elastic portion 332 is equal to the largest inner diameter of the first elastic portion 331, and an inner diameter of the third elastic portion 333 is greater than that of the second elastic portion 332. The first elastic portion 331, the second elastic portion 332, and the third elastic portion 333 are all hollow, thereby forming the cavity 330.

In some embodiments, a protrusion 311 extends from the first resisting portion 31 towards the second resisting portion 32. The protrusion 311 moves towards the membrane switch 40 in the cavity 330 when the pressing portion 11 is pressed. When the protrusion 311 is moved to make contact with the membrane switch 40, the membrane switch 40 is turned on, and the circuit board 60 electrically connected with the membrane switch 40 receives a signal. The circuit board 60 may be, but is not limited to, a printed circuit board assembly (PCBA).

In some embodiments, the elastic member 30 may be a rubber dome.

Referring to FIGS. 3, 4, 5, and 8, in some embodiments, the key structure 100 also includes a cover 70. The cover 70 is arranged between the keycap 10 and the circuit board 60. The cover 70 defines an opening 701 penetrating the cover 70, and the elastic member 30 is partially accommodated in the opening 701. Two second limiting portions 702 and two second locking members 703 are disposed on a surface of the cover 70 facing the keycap 10 and surround the opening 701. The two second locking members 703 and the two second limiting portions 702 cooperatively form a rectangle surrounding the opening 701. Each of the second limiting portions 702 includes a third plate 7021 and two fourth plates 7022 perpendicular to and connected with the third plate 7021. Four corners on the two second limiting portions 702 are four corners of the rectangle formed by the two second locking members 703 and the two second limiting portions 702. The second limiting portions 702 can abut against the first limiting portions 111 to limit a movement of the keycap 10 in a horizontal direction. Each of the second locking members 703 includes a second base body 7032 and a second locking portion 7031 extending from a bottom end of the second base body 7032 along a direction towards the extending portion 12. The second locking members 703 correspond in position to the first locking members 112. The second locking portion 7031 can engage with the first locking portion 1121 to limit a movement of the keycap 10 in a vertical direction, thereby preventing the keycap 10 from leaving the cover 70.

Second Embodiment

Figure 9:
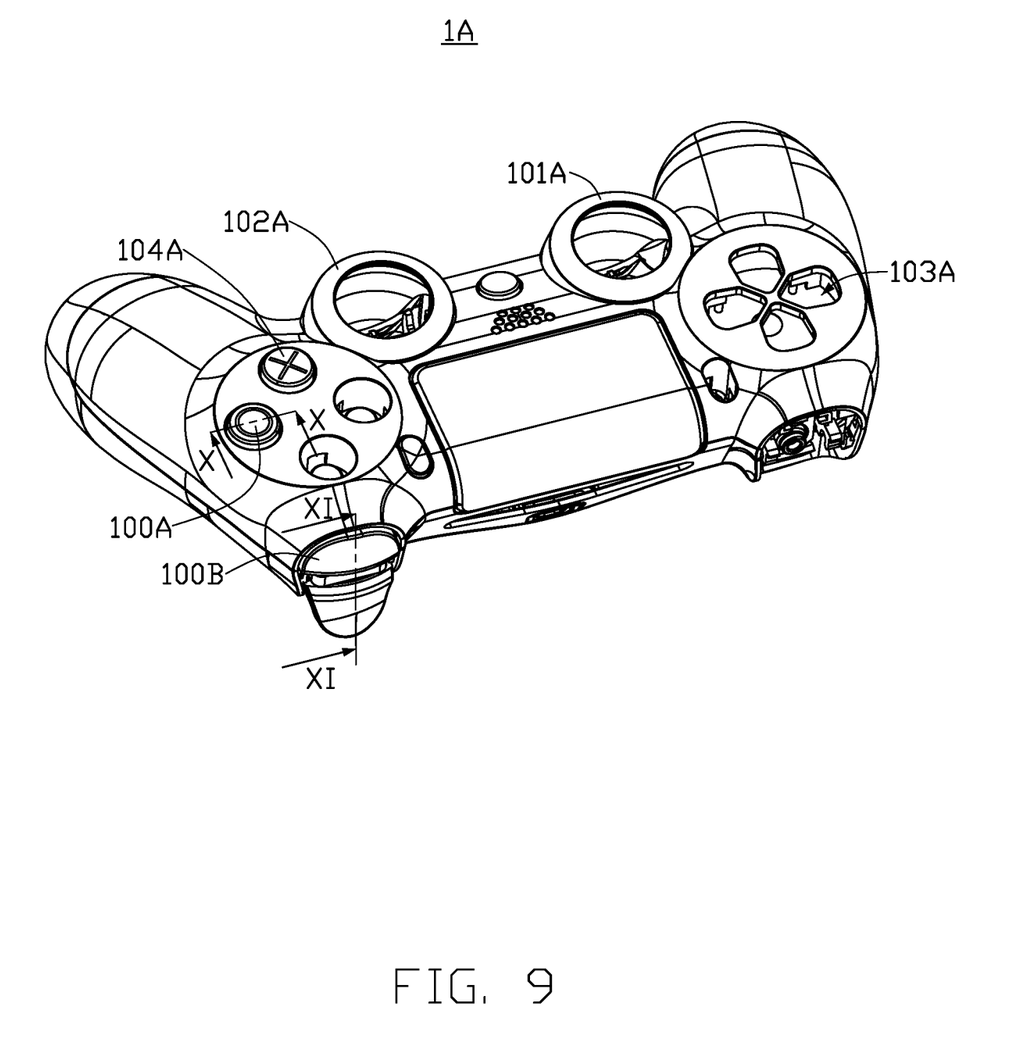
FIG. 9 is a perspective view of a key device according to another embodiment of the present disclosure.

Referring to FIG. 9, key structures 100A and 100B are applied to a key device 1A which is a gamepad. The gamepad includes a variety of keys, such as a left rocker key 101A, a right rocker key 102A, a cross key 103A, a function key 104A, and the key structures 100A and 100B.

Figure 10:
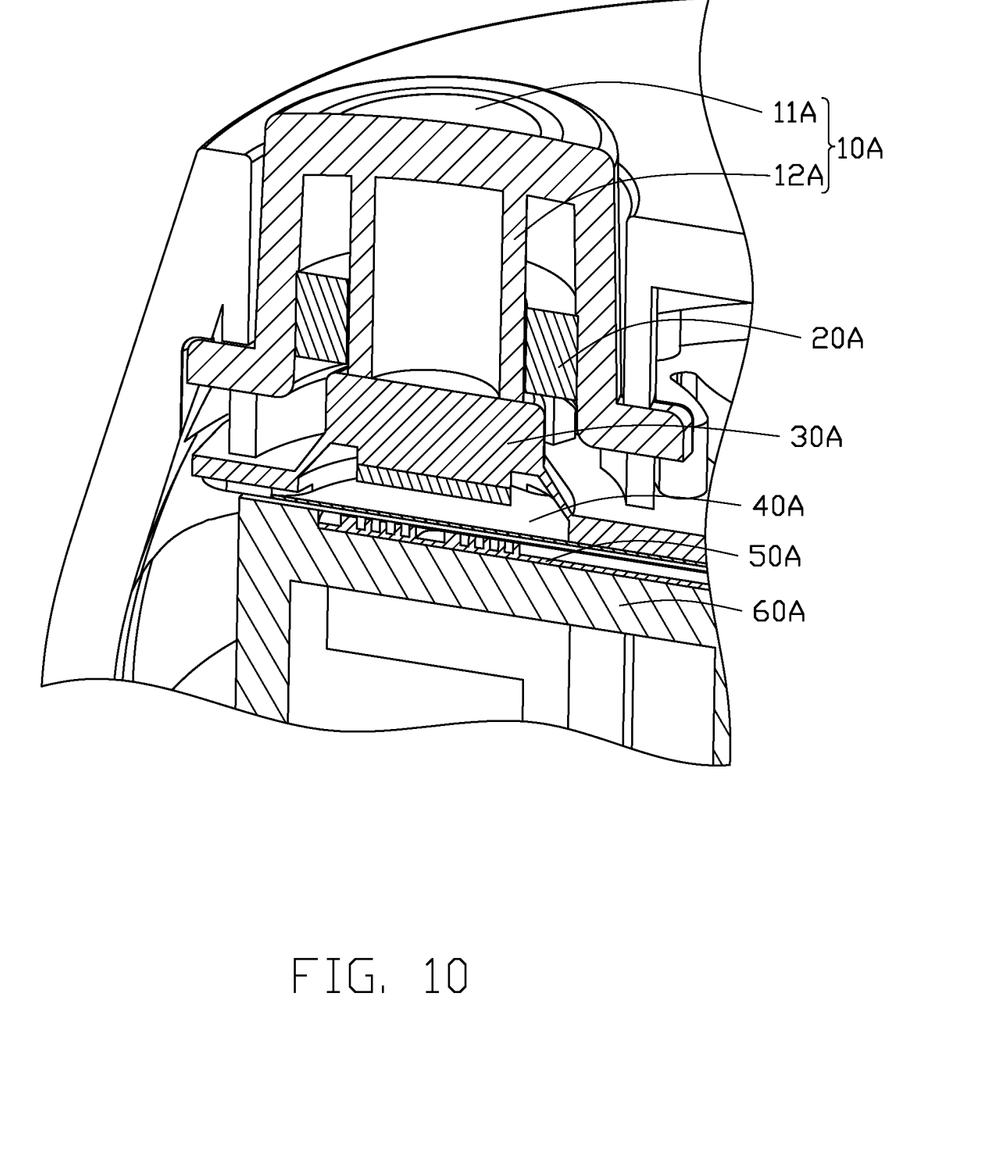
FIG. 10 is a cross-sectional view of a key structure taken along line X-X of FIG. 9.

Referring to FIG. 10, the key structure 100A is substantially the same as the key structure 100 in the first embodiment. The key structure 100A includes a keycap 10A, a first magnetic member 20A, an elastic member 30A, a membrane switch 40A, a second magnetic member 50A, and a circuit board 60A. The keycap 10A is substantially the same as the keycap 10 in the first embodiment. The keycap 10A includes a pressing portion 11A and an extending portion 12A connected with the pressing portion 11A, and the first magnetic member 20A is fixed to the extending portion 12A. The elastic member 30A abuts against an end of the extending portion 12A away from the pressing portion 11A, and the membrane switch 40A is disposed on an end of the elastic member 30A away from the keycap 10A. The elastic member 30A is the same as the elastic member 30 in the first embodiment. The elastic member 30A may be a rubber dome. The second magnetic member 50A is disposed between the membrane switch 40A and the circuit board 60A. When the second magnetic member 50A is energized, the second magnetic member 50A generates magnetic attraction or magnetic repulsion to the first magnetic member 20A. The circuit board 60A may be, but is not limited to, a printed circuit board assembly.

The first magnetic member 20A may be a permanent magnet, and the second magnetic member 50A may be an induction coil. When the keycap 10A is pressed, the first magnetic member 20A moves towards the second magnetic member 50A, according to Lenz's law, the second magnetic member 50A (induction coil) generates an induced current due to the change of a magnetic field. If a current in the same direction as the induced current is further applied, the second magnetic member 50A will generate a magnetic pole same as the first magnetic member 20A, generating magnetic repulsion to the first magnetic member 20A, thus the required pressing force may be increased. If a current opposite to the induced current is further applied, the second magnetic member 50A will generate a magnetic pole opposite to the first magnetic member 20A, generating magnetic attraction to the first magnetic member 20A, thus less pressing force is required. In a release (rebound) process of the keycap 10A, the induction coil generates an induced current to generate a magnetic field attracted to the first magnetic member 20A according to Lenz's law. Therefore, the following actions can be carried out for the induction coil to dynamically produce different effects on the keycap 10A. When a current in the same direction as the induced current is applied to the induction coil, the keycap 10A is attracted, and the time for the keycap 10A to return to its original position can be delayed, extending the rebound time. When a current opposite to the induced current is applied to the induction coil, a repulsive magnetic field is formed to speed up the return of the keycap 10A, shortening the rebound time.

Figure 11:
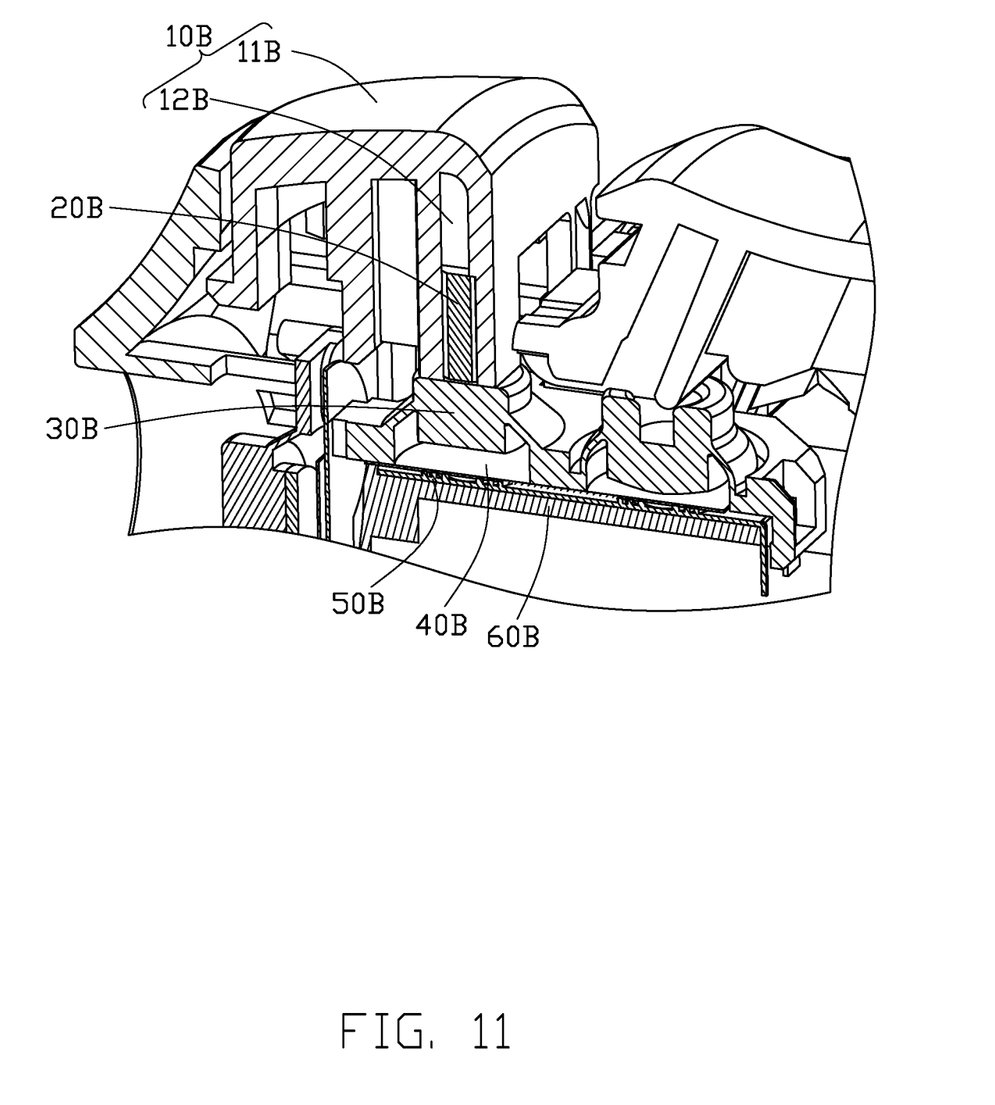
FIG. 11 is a cross-sectional view of a key structure taken along line XI-XI of FIG. 9.

Referring to FIG. 11, the key structure 100B is substantially the same as the key structure 100 in the first embodiment. The key structure 100B includes a keycap 10B, a first magnetic member 20B, an elastic member 30B, a membrane switch 40B, a second magnetic member 50B, and a circuit board 60B. The keycap 10B is substantially the same as the keycap 10 in the first embodiment. The keycap 10B includes a pressing portion 11B and an extending portion 12B connected with the pressing portion 11B, and the first magnetic member 20B is fixed to the extending portion 12B. The elastic member 30B abuts against an end of the extending portion 12B away from the pressing portion 11B, and the membrane switch 40B is disposed on an end of the elastic member 30B away from the keycap 10B. The elastic member 30B is the same as the elastic member 30 in the first embodiment. The elastic member 30B may be a rubber dome. The second magnetic member 50B is disposed between the membrane switch 40B and the circuit board 60B. When the second magnetic member 50B is energized, the second magnetic member 50B generates magnetic attraction or magnetic repulsion to the first magnetic member 20B. The circuit board 60B may be, but is not limited to, a printed circuit board assembly. The first magnetic member 20B may be a permanent magnet, and the second magnetic member 50B may be an induction coil. The pressing force required to activate the key structure 100B and the rebound force (time) of the key structure 100B can be dynamically adjusted by adjusting a direction or magnitude of the conduction current flowing through the second magnetic member 50B.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A key structure comprising:
   a circuit board;
   a keycap comprising a pressing portion and an extending portion connected with the pressing portion;
   a first magnetic member fixed on the extending portion;
   a membrane switch spaced apart from the first magnetic member;
   an elastic member compressed between the first magnetic member and the membrane switch; and
   a second magnetic member disposed between the membrane switch and the circuit board, wherein when the second magnetic member is energized, the second magnetic member generates magnetic attraction or magnetic repulsion to the first magnetic member.

2. The key structure of claim 1, wherein the elastic member comprises a first resisting portion, a second resisting portion, and an elastic deformable portion connecting the first resisting portion and the second resisting portion, the first resisting portion abuts against the keycap, the second resisting portion abuts against the membrane switch, a cavity is defined in the elastic deformable portion.

3. The key structure of claim 2, wherein the elastic member further comprises a protrusion extending from the first resisting portion towards the second resisting portion, the protrusion is moved towards the membrane switch in the cavity when the pressing portion is pressed.

4. The key structure of claim 1, wherein at least one reinforcing block is disposed on an outer peripheral surface of the extending portion, the first magnetic member is fixedly disposed on an end of the at least one reinforcing block close to the elastic member.

5. The key structure of claim 1, wherein a plurality of first limiting portions and a plurality of first locking members are disposed on a surface of the pressing portion close to the elastic member, the plurality of first limiting portions and the plurality of first locking members surround the extending portion.

6. The key structure of claim 5, further comprising a cover disposed between the keycap and the circuit board, wherein the cover defines an opening penetrating the cover, the elastic member is partially accommodated in the opening.

7. The key structure of claim 6, wherein a plurality of second limiting portions are disposed on a surface of the cover facing the keycap, the plurality of second limiting portions abut against the plurality of first limiting portions to limit a movement of the keycap in a horizontal direction.

8. The key structure of claim 7, wherein a plurality of second locking members are disposed on the surface of the cover facing the keycap, the plurality of second locking members and the plurality of second limiting portions surround the opening, the plurality of second locking members engage with the plurality of first locking members to limit a movement of the keycap in a vertical direction.

9. The key structure of claim 1, wherein the first magnetic member comprises a magnet, the second magnetic member comprises an induction coil, and the elastic member comprises a rubber dome.

10. A key device comprising a key structure, wherein the key structure comprises:
    a circuit board;
    a keycap comprising a pressing portion and an extending portion connected with the pressing portion;
    a first magnetic member fixed on the extending portion;
    a membrane switch spaced apart from the first magnetic member;
    an elastic member compressed between the first magnetic member and the membrane switch; and
    a second magnetic member disposed between the membrane switch and the circuit board, wherein when the second magnetic member is energized, the second magnetic member generates magnetic attraction or magnetic repulsion to the first magnetic member.

11. The key device of claim 10, wherein the elastic member comprises a first resisting portion, a second resisting portion, and an elastic deformable portion connecting the first resisting portion and the second resisting portion, the first resisting portion abuts against the keycap, the second resisting portion abuts against the membrane switch, a cavity is defined in the elastic deformable portion.

12. The key device of claim 11, wherein the elastic member further comprises a protrusion extending from the first resisting portion towards the second resisting portion, the protrusion is moved towards the membrane switch in the cavity when the pressing portion is pressed.

13. The key device of claim 10, wherein at least one reinforcing block is disposed on an outer peripheral surface of the extending portion, the first magnetic member is fixedly disposed on an end of the at least one reinforcing block close to the elastic member.

14. The key device of claim 10, wherein a plurality of first limiting portions and a plurality of first locking members are disposed on a surface of the pressing portion close to the elastic member, the plurality of first limiting portions and the plurality of first locking members surround the extending portion.

15. The key device of claim 14, wherein the key structure further comprises a cover disposed between the keycap and the circuit board, the cover defines an opening penetrating the cover, the elastic member is partially accommodated in the opening.

16. The key device of claim 15, wherein a plurality of second limiting portions are disposed on a surface of the cover facing the keycap, the plurality of second limiting portions abut against the plurality of first limiting portions to limit a movement of the keycap in a horizontal direction.

17. The key device of claim 16, wherein a plurality of second locking members are disposed on the surface of the cover facing the keycap, the plurality of second locking members and the plurality of second limiting portions surround the opening, the plurality of second locking members engage with the plurality of first locking members to limit a movement of the keycap in a vertical direction.

18. The key device of claim 10, wherein the first magnetic member comprises a magnet, the second magnetic member comprises an induction coil, and the elastic member comprises a rubber dome.

19. The key device of claim 10, wherein the key device is a membrane keyboard or a gamepad.

\* \* \* \* \*